United States Patent
Hung

(10) Patent No.: US 11,442,718 B2
(45) Date of Patent: Sep. 13, 2022

(54) EMBEDDED SYSTEM AND METHOD OF CONTROLLING NON-VOLATILE MEMORY TO PERFORM FIRMWARE UPDATE

(71) Applicant: Realtek Semiconductor Corp., HsinChu (TW)

(72) Inventor: Sheng-Kai Hung, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/189,273

(22) Filed: Mar. 2, 2021

(65) Prior Publication Data

US 2022/0100489 A1 Mar. 31, 2022

(30) Foreign Application Priority Data

Sep. 29, 2020 (TW) ................................ 109133952

(51) Int. Cl.
*G06F 8/65* (2018.01)
*G06F 11/14* (2006.01)
(Continued)

(52) U.S. Cl.
CPC .............. *G06F 8/65* (2013.01); *G06F 9/4401* (2013.01); *G06F 11/0757* (2013.01);
(Continued)

(58) Field of Classification Search
CPC ......... G06F 8/60–66; G06F 21/57–577; G06F 11/0757; G06F 11/0775; G06F 11/1433; G06F 11/1438; G06F 11/1417
(Continued)

(56) References Cited

U.S. PATENT DOCUMENTS 5,708,776 A * 1/1998 Kikinis ............... G06F 11/1417
714/10
8,281,119 B1 * 10/2012 Spangler ............... G06F 9/4401
713/1
(Continued)

FOREIGN PATENT DOCUMENTS

CN 102662706 A 9/2012
TW 201937367 A 9/2019

OTHER PUBLICATIONS

Execute in place, Wikipedia, 3 pages, 2019, [retrieved on Jun. 18, 2022], Retrieved from the Internet: <URL:https://web.archive.org/web/20190407090751/https://en.wikipedia.org/wiki/Execute_in_place>.*

(Continued)

*Primary Examiner* — Geoffrey R St Leger
(74) *Attorney, Agent, or Firm* — Winston Hsu

(57) ABSTRACT

A non-volatile memory includes a first block and a second block. The first block is used to store first firmware. The second block is used to store second firmware. A method of controlling the non-volatile memory includes comparing a version of the first firmware and a version of the second firmware, if a comparison result between the version of the first firmware and the version of the second firmware indicates that the second firmware is newer than the first firmware, employing the second firmware to perform a boot process, and if the boot process is successful, upgrading a portion of a firmware image to the first block whenever there is a firmware upgrade request after the boot process.

10 Claims, 6 Drawing Sheets

(51) Int. Cl.
    *G06F 11/07*         (2006.01)
    *G06F 9/4401*      (2018.01)
    *G06F 8/61*          (2018.01)

(52) U.S. Cl.
    CPC ...... *G06F 11/1417* (2013.01); *G06F 11/1433* (2013.01); *G06F 11/1438* (2013.01); *G06F 8/61* (2013.01); *G06F 8/63* (2013.01)

(58) Field of Classification Search
    USPC ................................................ 717/168–178
    See application file for complete search history.

(56) References Cited

U.S. PATENT DOCUMENTS

| | | | | |
|---|---|---|---|---|
| 10,809,944 | B1* | 10/2020 | Ostrikov | G06F 12/0246 |
| 2011/0087872 | A1* | 4/2011 | Shah | G06F 21/575 |
| | | | | 713/2 |
| 2019/0018669 | A1* | 1/2019 | Cook | G06F 9/4401 |
| 2019/0384586 | A1* | 12/2019 | Jiang | G06F 8/65 |
| 2020/0201617 | A1* | 6/2020 | Park | G06F 3/064 |

OTHER PUBLICATIONS

Firmware, Wikipedia, 7 pages, 2019, [retrieved on Jun. 18, 2022], Retrieved from the Internet: <URL:https://web.archive.org/web/20190113035429/https://en.wikipedia.org/wiki/Firmware>.*

* cited by examiner

EMBEDDED SYSTEM AND METHOD OF CONTROLLING NON-VOLATILE MEMORY TO PERFORM FIRMWARE UPDATE

CROSS REFERENCE TO RELATED APPLICATION

This non-provisional application claims priority of Taiwan patent application No. 109133952, filed on 29 Sep. 2020, included herein by reference in its entirety.

BACKGROUND OF THE INVENTION

1. Field of the Invention

The present invention relates to firmware update, in particular to a control method of non-volatile memory.

2. Description of the Prior Art

Embedded systems are computing systems embedded in a mechanical or electrical system to perform specific functions. Embedded systems cover various microcomputer-controlled devices, and may be driven by firmware to handle various situations and to meet various needs.

For embedded systems, firmware updates provide a crucial means to fix errors, add new functions, and extend the service life of embedded systems. If the firmware update fails, the embedded system may become out of function and unable to provide services properly.

SUMMARY OF THE INVENTION

According to an embodiment of the invention, a non-volatile memory includes a first block and a second block. The first block stores first firmware, and the second block stores second firmware. A method of controlling the non-volatile memory includes comparing a version of the first firmware to a version of the second firmware, if a comparison result of the version of the first firmware and the version of the second firmware indicates that the second firmware is newer than the first firmware, performing a boot process using the second firmware, and if the boot process is successful, duplicating a first portion of a firmware image to the first block to upgrade the first firmware upon a firmware upgrade request.

According another embodiment of the invention, a non-volatile memory includes a first block and a second block. The first block stores first firmware, and the second block stores second firmware. A method of controlling the non-volatile memory includes comparing a version of the first firmware to a version of the second firmware, if a comparison result of the version of the first firmware and the version of the second firmware indicates that the second firmware is newer than the first firmware, performing a boot process using the second firmware, and if the boot process has failed, performing another boot process using the first firmware.

According another embodiment of the invention, an embedded system includes a non-volatile memory and a processor. The non-volatile memory includes a first block used to store first firmware and a second block used to store second firmware. The processor is coupled to the non-volatile memory, and is used to compare a version of the first firmware to a version of the second firmware. If a comparison result of the version of the first firmware and the version of the second firmware indicates that the second firmware is newer than the first firmware, perform a boot process using the second firmware. If the boot process is successful, duplicate a first portion of a firmware image to the first block to upgrade the first firmware upon a firmware upgrade request.

According another embodiment of the invention, an embedded system includes a non-volatile memory and a processor. The non-volatile memory includes a first block used to store first firmware and a second block used to store second firmware. The processor is coupled to the non-volatile memory, and is used to compare a version of the first firmware to a version of the second firmware. If a comparison result of the version of the first firmware and the version of the second firmware indicates that the second firmware is newer than the first firmware, perform a boot process using the second firmware. If the boot process has failed, perform another boot process using the first firmware.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
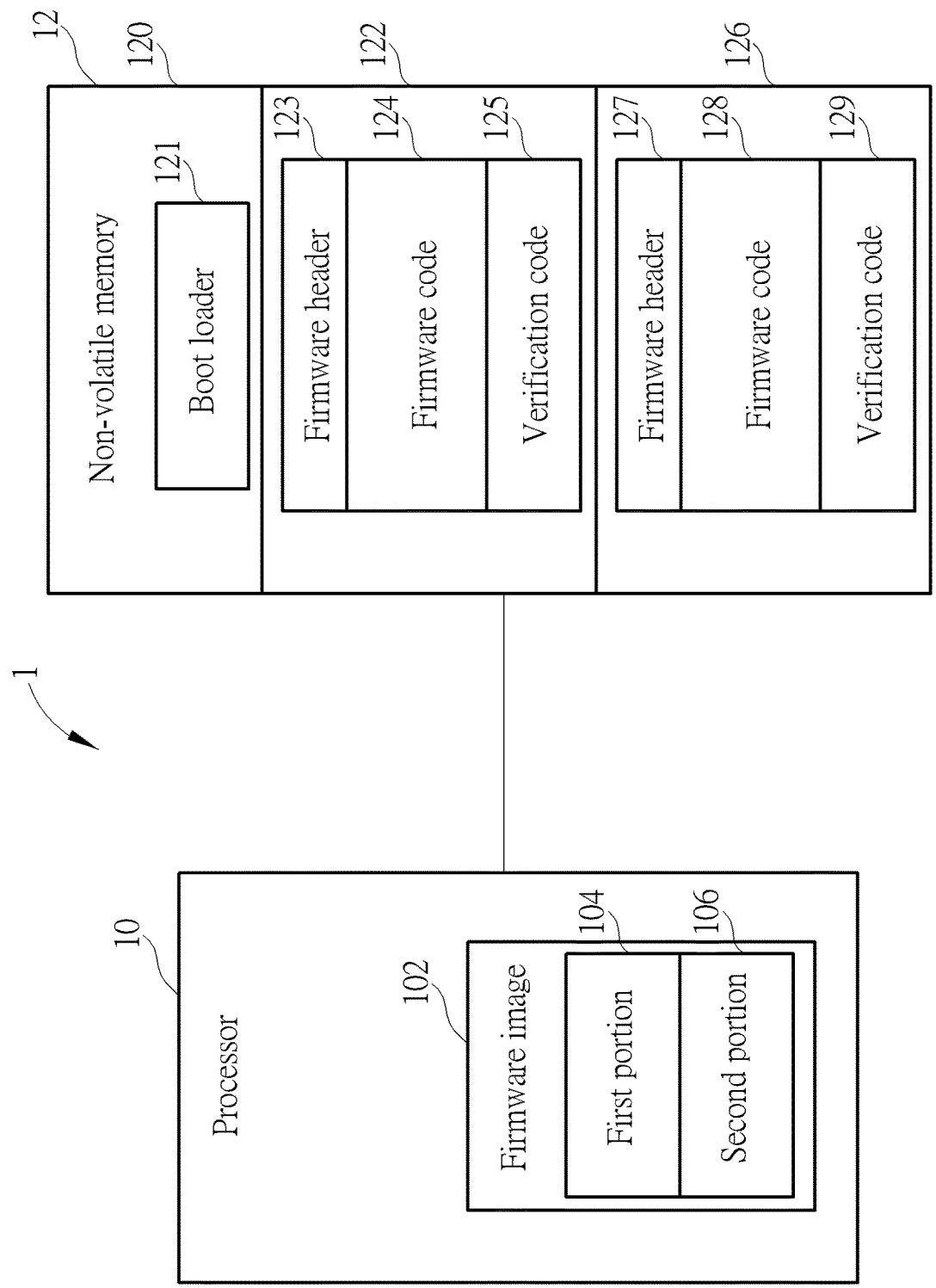
FIG. 1 is a block diagram of an embedded system according to an embodiment of the invention.

FIG. 1 is a block diagram of an embedded system 1 according to an embodiment of the invention. The embedded system 1 may be a mobile phone, a multimedia player, a game console, a digital camera, a home appliance, an automobile device or a positioning device. The embedded system 1 may store firmware to drive electrical components of the embedded system 1 in a boot process. The embedded system 1 may simultaneously provide services and update the firmware after a normal boot. When the update fails, the firmware in the other block can be used for boot and provide services, thereby providing fault tolerance mechanism during firmware update. In addition, the embedded system 1 may reduce the number of times of writing firmware into the same memory location, thereby extending the life cycles of the memory.

The embedded system 1 may include a processor 10 and a non-volatile memory 12. The non-volatile memory 12 may be a NOR flash memory including blocks 120, 122, and 126. The blocks 122 and 126 may be equal in size. When shipped out of the factory, the blocks 122 and 126 may respectively store the same version of the firmware. During the firmware update, the processor 10 may alternately update the different versions of firmware to blocks 122 and 126. In a boot process, the processor 10 may first execute the newer firmware either in the block 122 or block 126. If the newer firmware generates an error and fails to boot, the processor 10 may execute older firmware in the other block, either from the block 122 or the block 126. The older firmware may be used to ensure that the embedded system 1 can boot in any case.

Figure 2A:
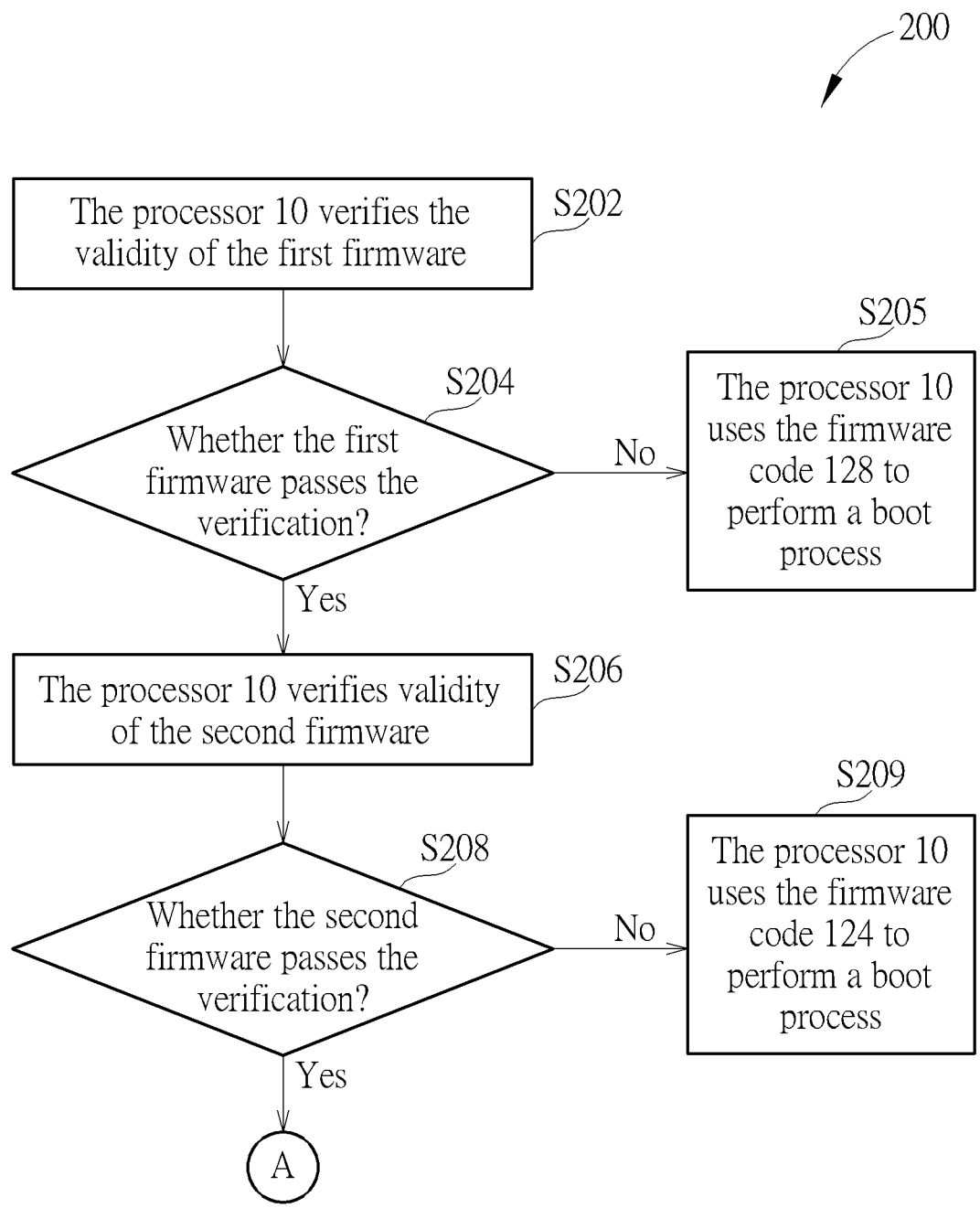
FIGS. 2A and 2B are flowcharts of a method of controlling the non-volatile memory of the embedded system in FIG. 1.
Figure 2B:
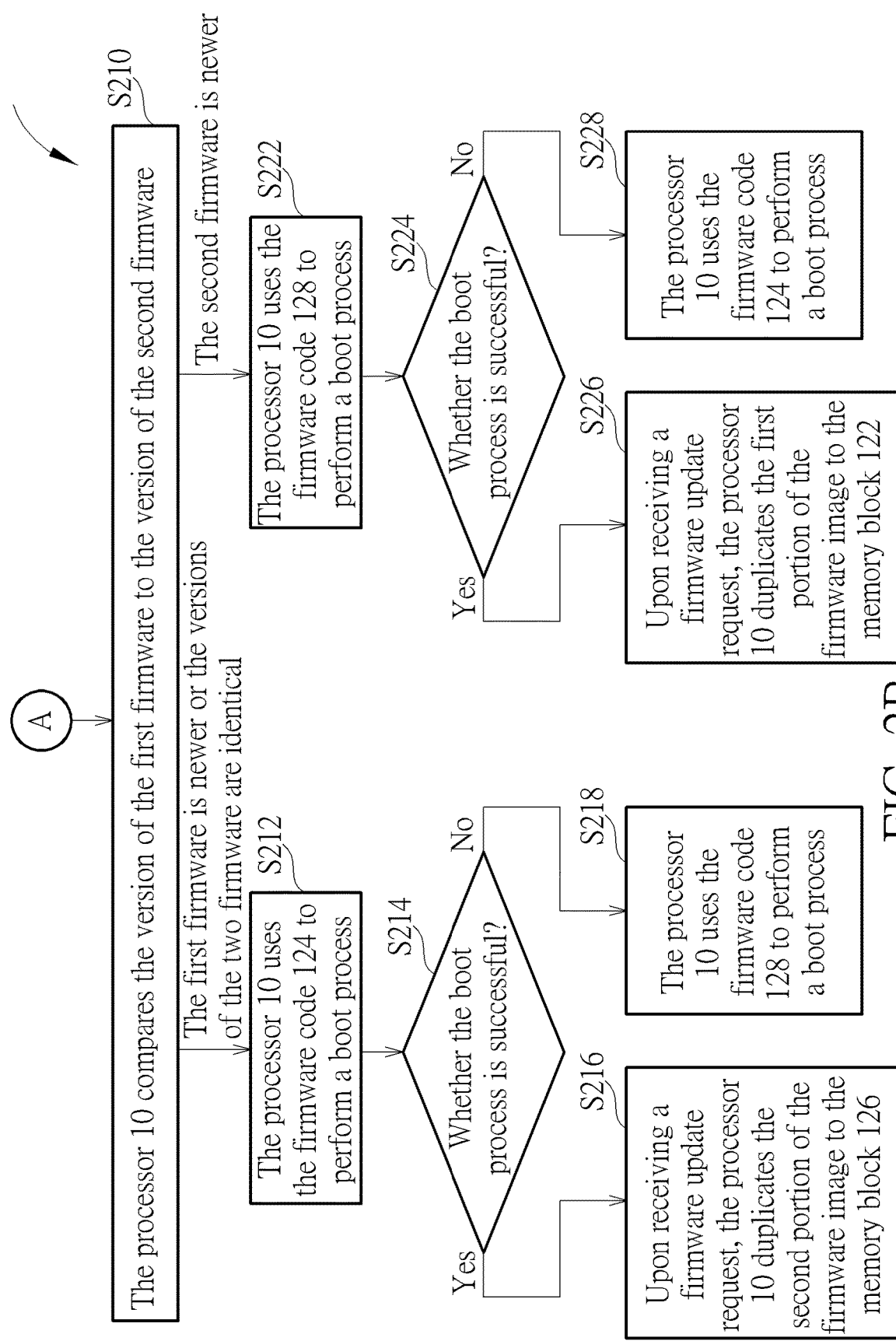

Specifically, the block 122 may store the first firmware including a firmware header 123, firmware code 124 and verification code 125. The block 126 may store the second firmware including a firmware header 127, firmware code 128, and verification code 129. The first firmware and the second firmware may be implemented by execution in place (XIP) code, and may have the same or different versions, respectively. When the XIP code is used, the processor 10 may access commands directly from the non-volatile memory 12 without duplicating the firmware to the internal memory. The firmware header 123 may include an update date, a version number, a firmware size, firmware identification code, and an address of the verification code 125 of the first firmware. The verification code 125 may be the signature of the first firmware or other error detection codes, such as cyclic redundancy code (CRC), or a digital signature signed by a certificate. The firmware header 127 may include an update date, a version number, a firmware size, firmware identification code, and an address of the verification code 129 of the second firmware. The verification code 129 may be the signature of the second firmware or other error detection code, such as cyclic redundancy code (CRC), or a digital signature signed by a certificate The block 120 may store a boot loader 121. The processor 10 may execute the boot loader 121 to select either the first firmware or the second firmware to perform a boot process. FIGS. 2A and 2B are flowcharts of a method 200 of controlling the non-volatile memory 12. The method 200 is implemented by the boot loader 121. The control method 200 includes Steps S202 to S228. Steps S202, S204, S206, and S208 are used to determine validity of the first firmware and the second firmware. Step S205 is used to boot the second firmware upon determining an invalid first firmware. Step S209 is used to boot the first firmware upon determining an invalid second firmware. Step S210 is used to determine which of the first firmware and the second firmware is newer. When the first firmware is newer or as new as the second firmware, Steps S212 to S218 are used to boot and update the firmware. When the second firmware is newer, Steps S222 to S228 are used to boot and update the firmware. Any reasonable step change or adjustment is within the scope of the disclosure. Steps S202 to S228 are detailed as follows:

Step S202: The processor 10 verifies the validity of the first firmware;

Step S204: The processor 10 determines whether the first firmware passes the verification? If so, go to Step S206; if not, go to Step S205;

Step S205: The processor 10 uses the firmware code 128 to perform a boot process.

Step S206: The processor 10 verifies validity of the second firmware;

Step S208: The processor 10 determines whether the second firmware passes the verification? If so, go to Step S210; if not, go to Step S209;

Step S209: The processor 10 uses the firmware code 124 to perform a boot process.

Step S210: The processor 10 compares the version of the first firmware to the version of the second firmware; if the first firmware is newer or the versions of the two firmware are identical, go to Step S212; if the second firmware is newer, go to Step S222;

Step S212: The processor 10 uses the firmware code 124 to perform a boot process;

Step S214: The processor 10 determines whether the boot process is successful? If so, go to Step S216; if not, go to Step S218;

Step S216: Upon receiving a firmware update request, the processor 10 duplicates the second portion of the firmware image to the memory block 126.

Step S218: The processor 10 uses the firmware code 128 to perform a boot process.

Step S222: The processor 10 uses the firmware code 128 to perform a boot process;

Step S224: The processor 10 determines whether the boot process is successful? If so, go to Step S226; if not, go to Step S228;

Step S226: Upon receiving a firmware update request, the processor 10 duplicates the first portion of the firmware image to the memory block 122.

Step S228: The processor 10 uses the firmware code 124 to perform a boot process.

When the verification code 125 and the verification code 129 are represented by a signature of the header, in Step S202, the processor 10 reads the firmware header 123 from the block 122, and uses a predetermined hash algorithm to compute a hash value of the firmware header 123, reads the verification code 125 from the firmware header 123 according to the address of the verification code 125, and determines whether the hash value of the firmware header 123 and the verification code 125 are matched to determine the validity of the first firmware. The hash algorithm may be the SHA-256 algorithm. In some embodiments, in Step S202, the validity of the verification code 125 may also be verified by a digital signature method. In Step S204, when the hash value of the firmware header 123 matches the verification code 125, the processor 10 determines that the first firmware passes the verification; and when the hash value of the firmware header 123 does not match the verification code 125, the processor 10 determines that the first firmware fails the verification. Similarly, in Step S206, the processor 10 reads the firmware header 127 from the block 126, and uses the predetermined hash algorithm to compute a hash value of the firmware header 127, reads the verification code 129 from the firmware header 127 according to the address of the verification code 129, and determines whether the hash value of the firmware header 127 and the verification code 129 are matched to determine the validity of the second firmware. In some embodiments, in Step S206, the validity of the verification code 129 may also be checked by a digital signature method. In Step S208, when the hash value of the firmware header 127 matches the verification code 129, the processor 10 determines that the second firmware passes the verification; and when the hash value of the firmware header 127 does not match the verification code 129, the processor 10 determines that the second firmware fails the verification. If the first firmware fails the verification, the processor 10 uses the firmware code 128 of the second firmware to boot (Step S205); if the second firmware fails the verification, the processor 10 uses the firmware code 124 of the first firmware to boot (Step S209).

If the first firmware and the second firmware pass the verification, both pieces of firmware are valid. The processor 10 obtains the version of the first firmware from the firmware header 123 and obtains the version of the second firmware from the firmware header 127, and then compares the version of the first firmware to the version of the second firmware to determine which one is newer (Step S210). In some embodiments, a larger version number indicates a newer firmware, and the processor 10 may determine which one of the version of the first firmware and the version of the second firmware has a larger version number, and determine that the firmware having the larger version number is the newer firmware. When the version of the first firmware and the version of the second firmware are identical, the first firmware and the second firmware have the same version.

When the first firmware is newer, the processor 10 uses the firmware code 124 to boot (Step S212), and determines whether the boot is successful (Step S214). If the number of reboots exceeds a predetermined number of reboots in a predetermined period of time, the processor 10 determines that the boot process has failed; whereas if the number of reboots does not exceed the predetermined number of reboots in the predetermined period of time, the processor 10 determines that the boot process is successful. For example, the predetermined period of time may be 10 minutes, and the predetermined number of reboots may be 3. If the actual number of reboots is 4 in 10 minutes, the processor 10 determines that the boot process has failed; if the actual number of reboots is 1 in 10 minutes, the processor 10 determines that the boot process is successful. In some embodiments, the processor 10 may use a watchdog timer to compute the actual number of reboots. The initial value of the actual number of reboots may be set to 0. The watchdog may reset the processor 10 if the preset timeout has occurred, e.g., 20 seconds. In a normal boot, the processor 10 may kick the watchdog within 20 seconds periodically to avoid timeout. In an abnormal boot, the processor 10 may not kick the watchdog so that watchdog timer would be expired, which in turn reset the CPU unexpectedly. Upon expiry of the watchdog timer, the processor 10 may increase the actual number of reboots and retry a reboot. If it has failed to boot the firmware code 124, the processor 10 will perform a reboot using the firmware code 128 (Step S218). If it is successful to boot the firmware code 124, upon receiving a firmware update request, the processor 10 will duplicate the second portion of the firmware image to the memory block 126 to update the second firmware (Step S216). The processor 10 may update the second firmware in the background process.

Similarly, when the second firmware is newer, the processor 10 uses the firmware code 128 to boot (Step S222), and determines whether the boot is successful (Step S224). If it has failed to boot the firmware code 128, the processor 10 will perform a reboot using the firmware code 124 (Step S228). If it is successful to boot the firmware code 128, upon receiving a firmware update request, the processor 10 will duplicate the first portion of the firmware image to the memory block 122 to update the first firmware (Step S226). The processor 10 may update the first firmware in the background process.

When the versions of the first firmware and the second firmware are identical, the processor 10 uses the firmware code 124 as a default to boot (Step S212), and determines whether the boot is successful (Step S214). If the boot process has failed using the firmware code 124, the processor 10 will perform a reboot using the firmware code 128 (Step S218). If it is successful to boot the firmware code 124, upon receiving a firmware update request, the processor 10 will duplicate the second portion of the firmware image to the memory block 126 to update the second firmware (Step S216).

The embedded system 1 updates the blocks 122 and 126 alternately to reduce the number of times of writing firmware into the same memory location, thereby extending the life cycles of the memory. The embedded system 1 executes the newer firmware to boot, and if it has failed to boot the newer firmware, the embedded system 1 will load the older firmware previously operating normally to boot again, thereby providing the fault tolerance of firmware updates. Since the difference between running the new firmware and running the old firmware is to switch between the firmware in the execution blocks 122 and 126, the durations for booting the embedded system 1 are identical, and no extra time is required for restoring the firmware, reducing the boot duration. In addition, because the firmware update occurs in the unused memory block and is executed in the background process, the embedded system 1 may continue to provide services without being interrupted by the firmware update, enhancing user experience.

Figure 4:
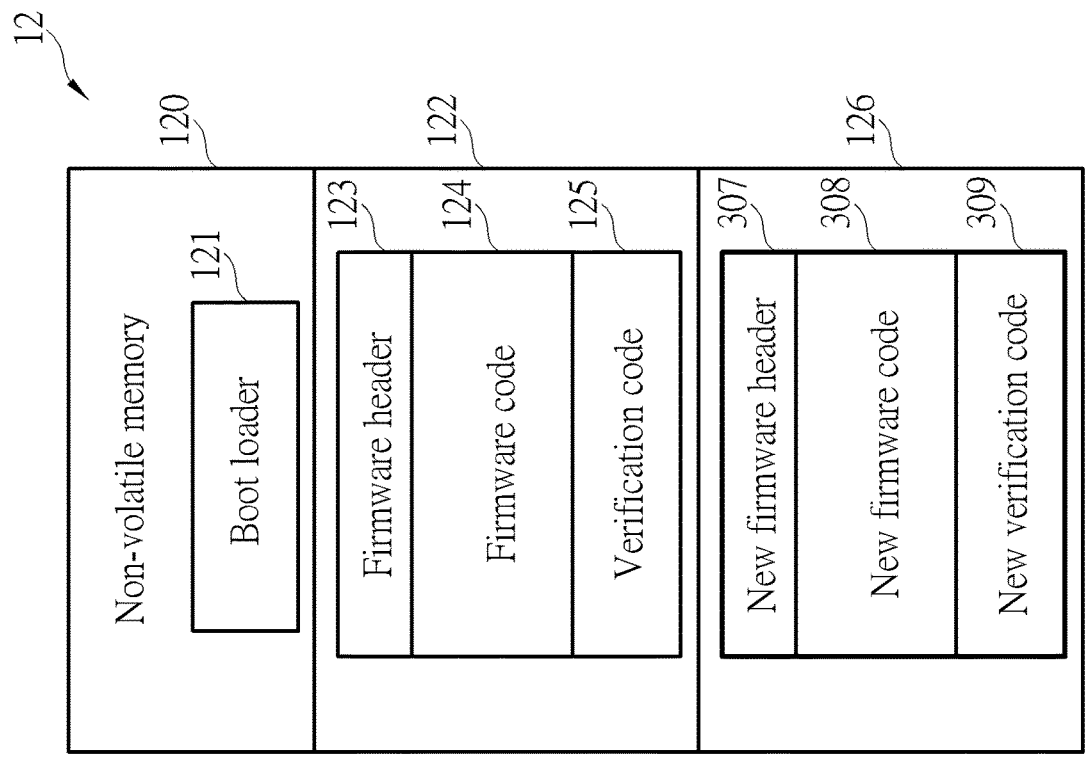
FIG. 4 shows a schematic diagram of a firmware update method for the non-volatile memory in FIG. 1.
Figure 3:
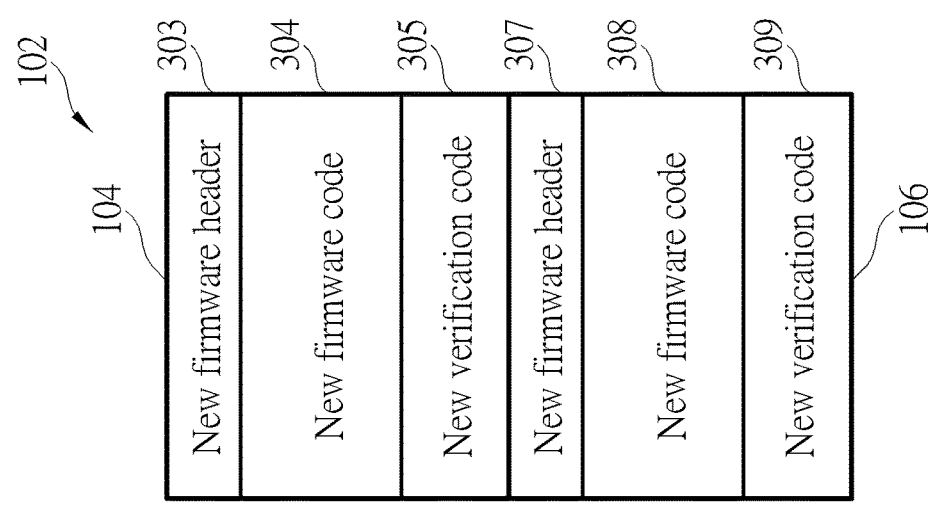
FIG. 3 is a schematic diagram of the firmware image in FIG. 1.
Figure 5:
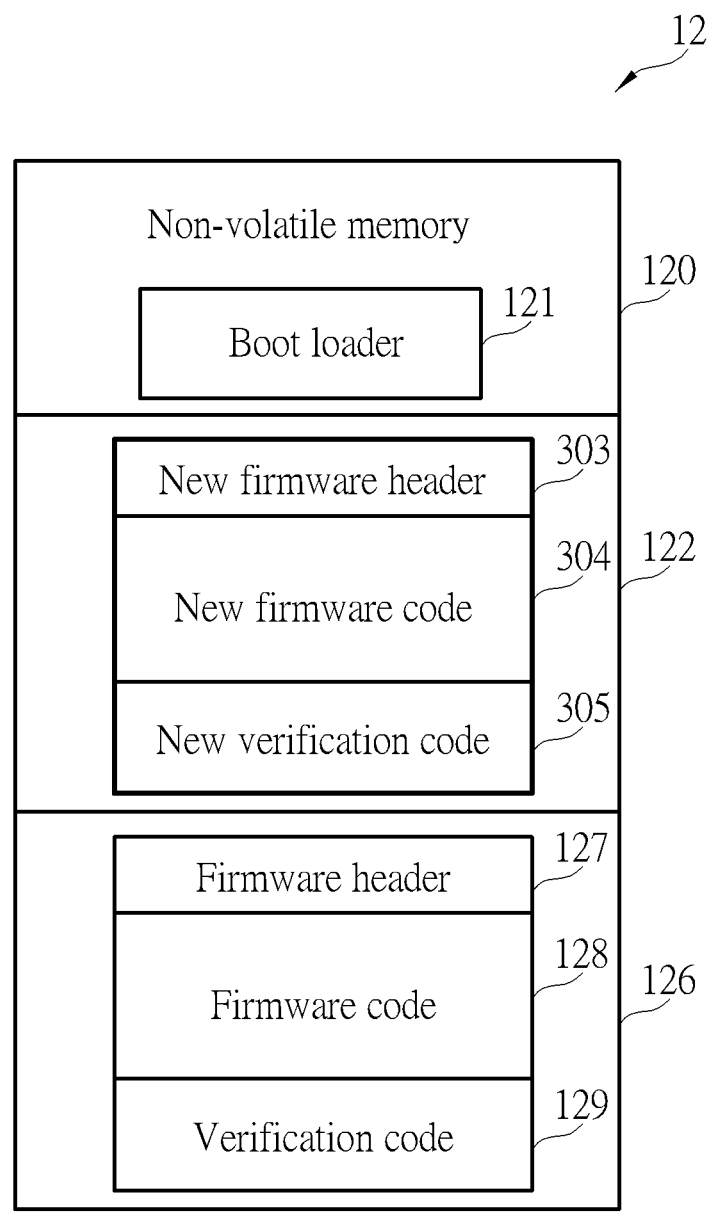
FIG. 5 shows a schematic diagram of another firmware update method for the non-volatile memory in FIG. 1.

Referring to FIG. 1, before the firmware update, an external device such as a computer may generate the object code and loads the linker to generate the firmware image 102. The firmware image 102 may be an executable file including a first portion 104 and a second portion 106, the first portion 104 and the second portion 106 being XIP codes of the same firmware linked to different execution addresses and having the same version. FIG. 3 is a schematic diagram of the firmware image 102. The first portion 104 includes a new firmware header 303, a new firmware code 304 and a new verification code 305. The second portion 106 includes a new firmware header 307, a new firmware code 308 and a new verification code 309. The new firmware code 304 may correspond to the addresses of block 122, and the new firmware code 308 may correspond to the addresses of block 126. When updating the firmware, if it is successful to boot the first firmware, the processor 10 may duplicate the second portion 106 to the block 126 to update the second firmware, as shown by the firmware update of the non-volatile memory 12 in FIG. 4. If it is successful to boot the second firmware, the processor 10 may duplicate the first portion 104 to the block 122 to update the first firmware, as shown by the firmware update of the non-volatile memory 12 in FIG. 5. FIG. 4 shows that the original firmware header 127, the firmware code 128, and the verification code 129 in the block 126 are updated to a new firmware header 307, new firmware code 308, and new verification code 309. FIG. 5 shows that the original firmware header 123, the firmware code 124, and the verification code 125 in the block 122 are updated to a new firmware header 303, new firmware code 304, and new verification code 305.

Figure 6:
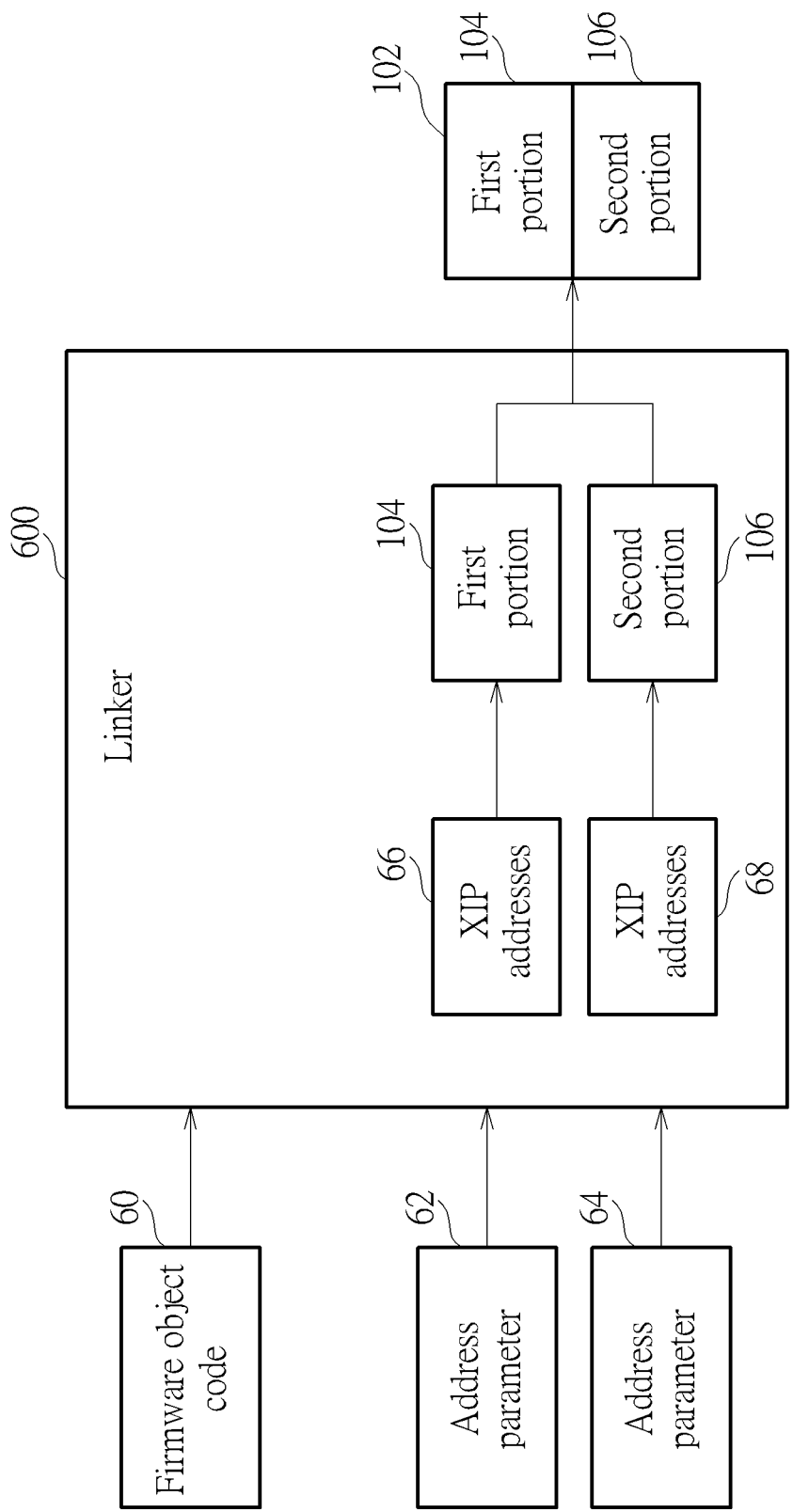
FIG. 6 is a schematic diagram of the linker in FIG. 1 generating the firmware image.

FIG. 6 is a schematic diagram of the linker 600 generating the firmware image 102. The linker 600 may be loaded by an external computer device to generate the first firmware and the second firmware. The computer device may also be used to generate the firmware image 102. The linker 600 may receive firmware object code 60 and address parameters 62 and 64. The firmware object code 60 may be machine code or other codes close to machine language, and is generated by a compiler or an assembly translator processing source code. The address parameter 62 may include a start address and a memory size of the block 122, and the address parameter 64 may include a start address and a memory size of the block 126. The linker 600 may generate a set of XIP addresses 66 corresponding to the block 122 according to the firmware object code 60 and the address parameter 62, and generate a set of XIP addresses 68 corresponding to the block 126 according to the firmware object code 60 and the address parameter 64. Next, the linker 600 may generate the first portion 104 according to the firmware object code 60 and the set of XIP addresses 66, and may generate the second portion 106 according to the firmware object code 60 and the set of XIP addresses 68. The first portion 104 and the second portion 106 may be executable files. Finally, the linker 600 may package the first portion 104 and the second portion 106 to generate the firmware image 102.

While the embodiments in FIGS. 1, 3 to 6 divide the non-volatile memory chip 12 into the blocks 120, 122 and 126, in other embodiments, the non-volatile memory chip 12 may be divided into more blocks to store a plurality of pieces of firmware. When performing a firmware update, the processor 10 may alternately store the firmware to be updated in unused block according to the firmware update principle. When performing a boot, the processor 10 may select the newest firmware from the pieces of firmware for booting according to the firmware selection principle. If the boot has failed, the processor 10 may select the next newest firmware from the pieces of firmware to continue booting until the boot succeeds.

The embodiments in FIG. 1 to FIG. 6 provide a firmware upgrade method providing uninterrupted services, being efficient and fault-tolerant, while effectively extending the life cycles of the non-volatile memory 12.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of controlling non-volatile memory, the non-volatile memory comprising a first block and a second block, the first block storing first firmware, and the second block storing second firmware, the method comprising:
generating a first portion of a firmware image according to a firmware object code and a first address parameter;
generating a second portion of the firmware image according to the firmware object code and a second address parameter, the first portion and the second portion having identical versions;
comparing a version of the first firmware to a version of the second firmware;
if a comparison result of the version of the first firmware and the version of the second firmware indicates that the second firmware is newer than the first firmware, performing a boot process using the second firmware; and
if the boot process is successful, duplicating the first portion of the firmware image to the first block to upgrade the first firmware upon a firmware upgrade request.

2. The method of claim 1, wherein the first portion and the second portion of the firmware image are execution in place (XIP) code.

3. The method of claim 1, wherein the first firmware is updated in a background process.

4. The method of claim 1, further comprising:
determining validity of the first firmware and validity of the second firmware;
wherein comparing the version of the first firmware to the version of the second firmware is performed when both the first firmware and the second firmware are valid.

5. The method of claim 1, further comprising determining that the boot process is successful if a quantity of reboots does not exceed a predetermined quantity in a predetermined period of time.

6. An embedded system comprising:
a non-volatile memory comprising:
a first block configured to store first firmware; and
a second block configured to store second firmware; and
a processor coupled to the non-volatile memory, and configured to:
compare a version of the first firmware to a version of the second firmware;
if a comparison result of the version of the first firmware and the version of the second firmware indicates that the second firmware is newer than the first firmware, perform a boot process using the second firmware; and
if the boot process is successful, duplicate a first portion of a firmware image to the first block to upgrade the first firmware upon a firmware upgrade request;
wherein the first portion of the firmware image is generated according to a firmware object code and a first address parameter;
a second portion of the firmware image is generated according to the firmware object code and a second address parameter; and
the first portion and the second portion of the firmware image are execution in place (XIP) code having identical versions.

7. The embedded system of claim 6, wherein the processor is further configured to determine validity of the first firmware and validity of the second firmware, and compare the version of the first firmware and the version of the second firmware when both the first firmware and the second firmware are valid.

8. The embedded system of claim 6, wherein the processor is configured to update the first firmware in a background process.

9. The embedded system of claim 6, wherein the processor is further configured to determine validity of the first firmware and validity of the second firmware, and compare the version of the first firmware and the version of the second firmware when both the first firmware and the second firmware are valid.

10. The embedded system of claim 6, wherein the processor is configured to determine that the boot process is successful if a quantity of reboots does not exceed a predetermined quantity in a predetermined period of time.

\* \* \* \* \*